Patented May 27, 1930

1,760,758

UNITED STATES PATENT OFFICE

ERNST KORTEN, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING CONDENSATION PRODUCTS FROM HYDROXY-BENZENES AND HYDROAROMATIC RINGKETONES

No Drawing. Application filed January 5, 1928, Serial No. 244,777, and in Germany January 20, 1927.

The present invention relates to a process of manufacturing condensation products of a hydroxy benzene compound with a hydro aromatic ring ketone compound and to the new products obtainable by this process.

I have found that valuable condensation products are obtainable in a very smooth reaction and with a good yield by condensing a hydroxy benzene compound with a hydro aromatic ring ketone compound by means of hydrohalic acid in an acetic acid solution. They correspond probably to the general formula:

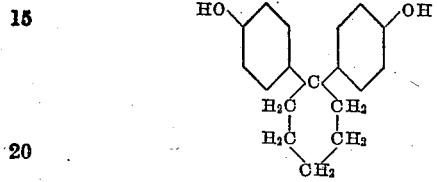

in which all of the three nuclei may contain further substituents. They are new compounds, if at least one substituent is present either in one of the benzene nuclei or in the hexahydrobenzene nucleus. The condensation products are important intermediates for the production of dyestuffs and pharmaceutical products.

Instead of using an aqueous solution of a hydrohalic acid or its solution in an organic solvent with the same result a gaseous hydrohalic acid may be introduced into the reaction mixture.

The smooth course of reaction and the homogeneous formation of the aforesaid condensation products is a surprising fact, as on the one hand Schmidlin and Lang (Ber. d. deutsch. chem. Ges. vol. 43, page 2820) when using concentrated sulfuric acid as the condensing agent could obtain 4.4'-dihydroxydiphenyl-cyclohexane only with a very small yield, and on the other hand Sen Gupta (Journal of Chemical Society, London, vol. 105, page 400) when starting from hydroxy compounds of the naphthalene series and using a hydrohalic acid as the condensing agent obtained a product of an entirely different chemical constitution.

In order to further illustrate my invention the following examples are given, the parts being by weight and all temperatures in centigrade degrees. But I wish to be understood that I am not limited to the particular conditions nor to the specific products mentioned therein.

Example 1

A mixture of 98 parts of cyclohexanone, 416 parts of phenol, 515 parts of glacial acetic acid and 186 parts of hydrochloric acid of about 38% strength is warmed at about 50°. After short time the separation of abundant quantities of crystals begins. After warming for about 24 hours the reaction mass is cooled and the precipitate is filtered off. When warming the filtrate once more at about 50° and allowing it to stand for some time some further amounts of the same substance are separated. The 4.4'-dihydroxydiphenyl-cyclohexane, thus obtained with an excellent yield and corresponding probably to the formula:

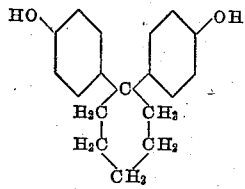

crystallizes from dilute acetic acid as small white needles, melting at 186°, as described by Schmidlin and Lang (l.c.).

Example 2

Into a solution of 98 parts of cyclohexanone and 416 parts of phenol in 500 parts of glacial acetic acid at about 50° a slow current of dry hydrochloric acid gas is introduced.

The color of the solution soon turns yellowish red. After about two hours the introduction of the gas is interrupted and the mixture is allowed to stand at the same temperature. After about 24 hours the mass is cooled and the reaction product is isolated as described in Example 1. The 4.4'-dihydroxydiphenyl-cyclohexane is thus obtained with an excellent yield.

*Example 3*

A mixture of 100 parts of cyclohexanone, 480 parts of ortho-cresol, 580 parts of glacial acetic acid and 190 parts of hydrochloric acid of 38% strength is heated to about 50°. The originally colorless solution turns after a short time yellowish red and becomes dark violet after some hours. An abundant quantity of a hard mass of crystals separates and after about 30 hours the warming is interrupted. By well cooling the mixture solidifies to a firm pulp of crystals, which is filtered off. The residue is dark violet colored and becomes immediately almost colorless when washed with a little acetic acid of 50% strength. The new 4.4'-dihydroxy-3.3'-dimethyldiphenyl-1.1'-cyclohexane of the formula:

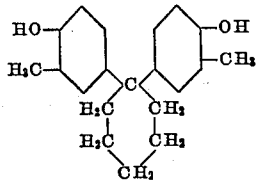

thus obtained crystallizes from a little quantity of dilute acetic acid as rectangular small bright whitish tables melting at 186°.

*Example 4*

A solution of 41 parts of para-methylcyclohexanone and 140 parts of phenol in 165 parts of glacial acetic acid and 62 parts of hydrochloric acid of about 38% strength is warmed to about 50–60°. The originally colorless solution turns gradually a yellowish red. After warming for about one day, the mass is well cooled and the yellowish red pulp of crystals, which fills up whole the liquor, is filtered off. The precipitate is washed with a little dilute acetic acid, until the adherent coloration disappears; recrystallized from boiling dilute acetic acid the 4.4'-dihydroxy-1.1'-diphenyl-4''-methyl-cyclohexane, corresponding probably to the formula:

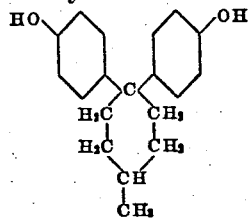

is obtained forming small bright needles and melting at 179°.

I claim:
1. Process for manufacturing condensation products, corresponding probably to the general formula:

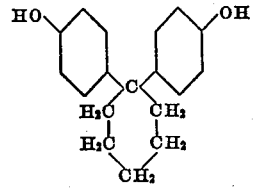

in which formula all of the three nuclei may contain further substituents, which process comprises condensing a hydroxy benzene compound with a hydro aromatic ring ketone compound of the cyclohexane series by means of a hydrohalic acid.

2. Process for manufacturing condensation products, corresponding probably to the general formula:

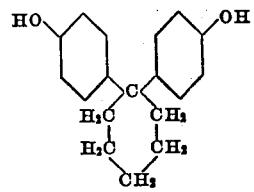

in which formula all of the three nuclei may contain further substituents, which process comprises condensing a hydroxy benzene compound with a hydro aromatic ring ketone compound of the cyclohexane series by means of a hydrohalic acid in an acetic acid solution.

3. As new compounds condensation products corresponding probably to the general formula:

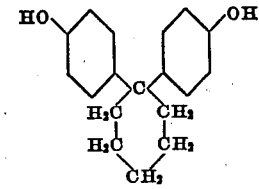

in which formula at least one alkyl group is contained in one of the three nuclei, which compounds are when dry almost colorless crystalline substances, soluble in organic solvents and having a definite melting point.

In testimony whereof, I affix my signature.

ERNST KORTEN.